United States Patent
Maze et al.

(10) Patent No.: US 7,871,585 B2
(45) Date of Patent: Jan. 18, 2011

(54) METHOD AND DEVICE FOR TREATING FUMES GENERATED DURING THE PRODUCTION, CONVERSION AND/OR HANDLING OF OIL-BASED PRODUCTS

(75) Inventors: Michel Maze, Bordeaux (FR); Jean-Pierre Marchand, Montesson (FR); Jacques Amouroux, Paris (FR); Sergey Dresvin, Paris (FR); Pascal Rousseau, Bordeaux (FR)

(73) Assignee: Eurovia, Rueil Malmaison (FR)

( * ) Notice: Subject to any disclaimer, the term of this patent is extended or adjusted under 35 U.S.C. 154(b) by 1211 days.

(21) Appl. No.: 10/584,404

(22) PCT Filed: Dec. 24, 2004

(86) PCT No.: PCT/FR2004/003382

§ 371 (c)(1),
(2), (4) Date: Jun. 26, 2006

(87) PCT Pub. No.: WO2005/068054

PCT Pub. Date: Jul. 28, 2005

(65) Prior Publication Data

US 2007/0196254 A1   Aug. 23, 2007

(30) Foreign Application Priority Data

Dec. 26, 2003   (FR) .................................. 03 15457

(51) Int. Cl.
*B01D 53/34* (2006.01)
*B01D 53/72* (2006.01)
*B01D 53/74* (2006.01)

(52) U.S. Cl. ............ 423/210; 423/245.1; 423/DIG. 10; 422/168; 422/186; 422/186.04; 204/157.63; 204/164; 204/165; 204/168; 204/172; 134/1.1

(58) Field of Classification Search ................. 423/210, 423/245.1, DIG. 10; 422/168, 186, 186.04; 204/157.63, 164, 165, 168, 172; 134/1.1
See application file for complete search history.

(56) References Cited

U.S. PATENT DOCUMENTS

| 3,006,831 | A | * | 10/1961 | Illman .................... 204/157.63 |
| 3,240,691 | A | * | 3/1966 | Mastrangelo ............... 204/169 |
| 5,240,575 | A | | 8/1993 | Mathur et al. |
| 5,843,288 | A | | 12/1998 | Yamamoto |
| 6,132,692 | A | | 10/2000 | Alix et al. |
| 2002/0074221 | A1 | * | 6/2002 | Mallinson et al. ........... 204/170 |
| 2003/0170154 | A1 | | 9/2003 | Andrews et al. |

FOREIGN PATENT DOCUMENTS

| GB | 799 625 A | 8/1958 |
| WO | WO 99/12638 A | 3/1999 |

* cited by examiner

*Primary Examiner*—Timothy C Vanoy
(74) *Attorney, Agent, or Firm*—Foley & Lardner LLP

(57) ABSTRACT

The invention relates to a method for treating fumes generated during the production, conversion and/or handling of oil-based products and a device for carrying out said method. The invention further relates to the use of the method or device in which the trapping device comprises at least one fluidized bed of granular material in the preparation of a granular material for use in production of road materials.

28 Claims, 1 Drawing Sheet

METHOD AND DEVICE FOR TREATING FUMES GENERATED DURING THE PRODUCTION, CONVERSION AND/OR HANDLING OF OIL-BASED PRODUCTS

This application is a National Stage application of PCT/FR2004/003382, filed Dec. 24, 2004, which claims priority from French patent application FR 0315457, filed Dec. 26, 2003. The entire contents of each of the aforementioned applications are incorporated herein by reference.

The present invention relates to the general technical field of the treatment of fumes issuing from products of petroleum origin.

In particular, the present invention relates to a method for treating fumes generated during the production, conversion and/or handling of heated products of petroleum origin, advantageously at a temperature of or above 50° C. under atmospheric pressure, such as hydrocarbons, asphalts and bituminous mixes. The invention also relates to a device for treating fumes generated during the production, conversion and/or handling of heated products of petroleum origin, suitable for carrying out the method. The present invention also relates to the use of said method or said device in the preparation of an aggregate used in the production of a roadbuilding product, such as a hot mix or a bituminous mix.

The production, conversion, handling and/or transport of products of petroleum origin, such as hydrocarbon products, lead to the emission of volatile organic compounds (VOC).

In the industry producing products of petroleum origin, such as bituminous products, the main sources of VOC emissions are plants producing hydrocarbon binders (storage tanks, mixers and asphalt loading stations), asphalt plants (storage tanks, asphalt weighers, mixer drainage, transfers of bituminous products), and bituminous product construction sites (spreader: binder spreading; and finisher: unloading of the truck containing hot mixes in the hopper). The VOC emissions (mainly alkanes, alkenes and aromatic hydrocarbons) are produced by the decomposition of asphaltenes, paraffinic hydrocarbons and sulfur bearing cyclic compounds, and are the main result of the gas-liquid and liquid-solid reactions which cause emissions of complex chemical compounds.

In order to comply with the forthcoming regulatory and environmental provisions, VOC treatment is one of the major challenges, particularly in the treatment of releases of products of petroleum origin.

Many methods for treating VOC have heretofore been developed. At present, the main VOC treatment techniques are adsorption (on granular activated carbon, on activated carbon fabric or on other adsorbents), absorption (by scrubbing with water, oil or other absorbents), thermal oxidation or biological methods.

However, while these techniques may be ideal for treating relatively low air flows containing a high VOC concentration, they remain ineffective for treating high throughput effluents with very low VOC concentrations (about 100 to 1000 ppm), or for treating complex effluents, laden with impurities, as is the case for VOC issuing from products of petroleum origin. Furthermore, adsorption on activated carbon does not permit comprehensive treatment of all the molecular species included in the fumes (selective adsorption). Moreover, the VOC treatment methods and devices of the prior art mentioned above are generally costly and are still inadequate for handling the high gas flows from a large number of industrial units. In particular, the activated carbon adsorption technique implies high costs and substantial means for regenerating and upgrading the trapping materials.

In consequence, a need therefore existed, particularly in the field of the treatment of products of petroleum origin, of the bituminous type, to develop a method for treating fumes generated during the production, conversion and/or handling of heated products of petroleum origin, not having the drawbacks of the prior art methods.

The present invention is aimed to fill this need. The applicant has thus discovered a novel method for treating fumes generated during the production, conversion and/or handling of heated products of petroleum origin, permitting the effective treatment of VOC of various types, with a high yield, without generating high olfactory pollution, suitable for complying with present European regulatory and environmental provisions and anticipating those to come, and possibly suitable for recycling the various materials used. The method according to the present invention is also suitable for recycling the granular materials used for trapping the reaction products generated in the treatment reactor, when the device for trapping said products comprises a fluidized bed of granular materials.

Moreover, the method according to the present invention is suitable for the efficient treatment of VOC, because it comprises several treatment levels. The method thereby allows a chemical modification of the fume components to be treated by oxidation due to the active species formed in the plasma reactor outside equilibrium (ozone, excited molecular and atomic oxygens). The method according to the present invention is also suitable for trapping the reaction products generated in the reactor from free radical entities using at least one appropriate trapping device. Finally, the method according to the present invention advantageously provides a means for introducing the fumes by Venturi effect. This serves to change the speed of the gases to be treated and, by the negative pressure zone, to blend the fumes with the dielectric discharge gases in the reactor. The method thereby protects the dielectric discharge zone from any deposits and promotes the mixing necessary for free radical formation.

The subject of the present invention is thus a method for treating fumes generated during the production, conversion and/or handling of heated products of petroleum origin, such as hydrocarbons, asphalts and bituminous hot mixes, characterized in that it implies:

the introduction of said fumes into a reactor in which the fume components undergo free radical degradation by cold plasma generated in the reactor by the introduction of air through at least one dielectric barrier discharge arranged close to at least one of the reactor walls which extend parallel to the flow direction of the fumes passing through the reactor, and the retention of the reaction products generated in the reactor from the free radical entities resulting from the degradation of the fume components, using at least one appropriate trapping device.

In a particular embodiment of the present invention, the fumes are introduced by a carrier air stream.

Advantageously according to the present invention, at least one dielectric barrier discharge is arranged at least one of the reactor walls which extend parallel to the flow direction of the fumes passing through the reactor.

In a particular embodiment of the present invention, at least one dielectric barrier discharge is present close to each side wall of the reactor.

Advantageously according to the present invention, at least one dielectric barrier discharge is arranged at each side wall of the reactor.

According to a particular feature of the present invention, the trapping device comprises at least one fluidized bed of an advantageously mineral medium.

In a particular embodiment of the present invention, said medium is a granular material advantageously containing alumina, silica, or calcite. In a particular embodiment of the present invention, said medium is a microporous granular material such as zeolite or pumice. In another particular embodiment of the present invention, said medium is a basic granular material such as pozzolan or a carbonate type rock.

According to a particular feature of the present invention, the size of said medium is between 0.5 mm and 20 mm, advantageously between 1 mm and 10 mm.

Advantageously according to the present invention, the fluidized bed is fixed or circulating.

In a particular embodiment of the present invention, another dielectric barrier discharge is located close to the reactor outlet, advantageously placed perpendicular to the flow direction of the fumes passing through the reactor.

In a particular embodiment, the method according to the present invention further comprises, at the reactor outlet, a step of degradation of the residual ozone formed in the reactor by the passage of the air through the dielectric barrier discharge(s).

In a particular embodiment, the method according to the present invention further comprises an at least partial recirculation of the purified gases located in the gas stream leaving the reactor to the reactor inlet, in a mixture with the fumes to be treated.

The present invention also relates to a device for treating fumes generated during the production, conversion and/or handling of heated products of petroleum origin, such as hydrocarbons, asphalts and bituminous hot mixes, in a reactor (1) comprising:
- at least one fume introduction system (2) in the lower part of the reactor (1),
- at least one dielectric discharge member (3) replacing at least part of at least one of the reactor walls (1) which extend parallel to the flow direction of the fumes passing through the reactor,
- at least one system for introducing air (4) through said dielectric discharge member(s),
- at least one appropriate trapping device (5) for retaining the reaction products generated in the reactor, and
- at least one discharge stack (6).

In a particular embodiment of the present invention, the fume introduction system (2) contains a Venturi (2').

In a particular embodiment of the present invention, the dielectric discharge member(s) (3) is (are) made in the form of modulable cassettes each consisting of a plurality of parallel electric tubes (7), said electric tubes each consisting of electric wires (8) sheathed in a dielectric insulation (9) and supplied by a high voltage generator.

In a particular embodiment of the present invention, the electric wires (8) are of copper.

In a particular embodiment of the present invention, the dielectric insulation (9) is of quartz, ceramic or glass.

In a particular embodiment of the present invention, the diameter of the dielectric insulation sheath (9) is between 2 and 10 mm.

According to a particular feature of the present invention, the space between the parallel electric tubes (7) is between 1 and 2 mm.

According to a particular feature of the present invention, at least one dielectric discharge member (3) is present to replace at least part of each side wall of the reactor (1), said members (3) being advantageously arranged in a face-to-face layout.

Advantageously according to the present invention, the trapping device (5) comprises at least one fluidized bed of an advantageously mineral medium.

In a particular embodiment, the device according to the present invention further comprises at least one filter means (10, 11) in the upper part of the reactor (1) before the discharge stack (6).

In a particular embodiment, the device according to the present invention further comprises at least one dielectric discharge member (3), in the upper part of the reactor (1), before the discharge stack (6).

The present invention also relates to the use of the method or device described above, in which the trapping device (5) comprises at least one fluidized bed of granular materials, in the preparation of an aggregate used in the production of a roadbuilding material.

In a particular embodiment, the roadbuilding product is a hot mix or a bituminous mix.

Various objects and advantages of the present invention will appear to a person skilled in the art through the references to the illustrative drawings appended hereto:

Figure 1:
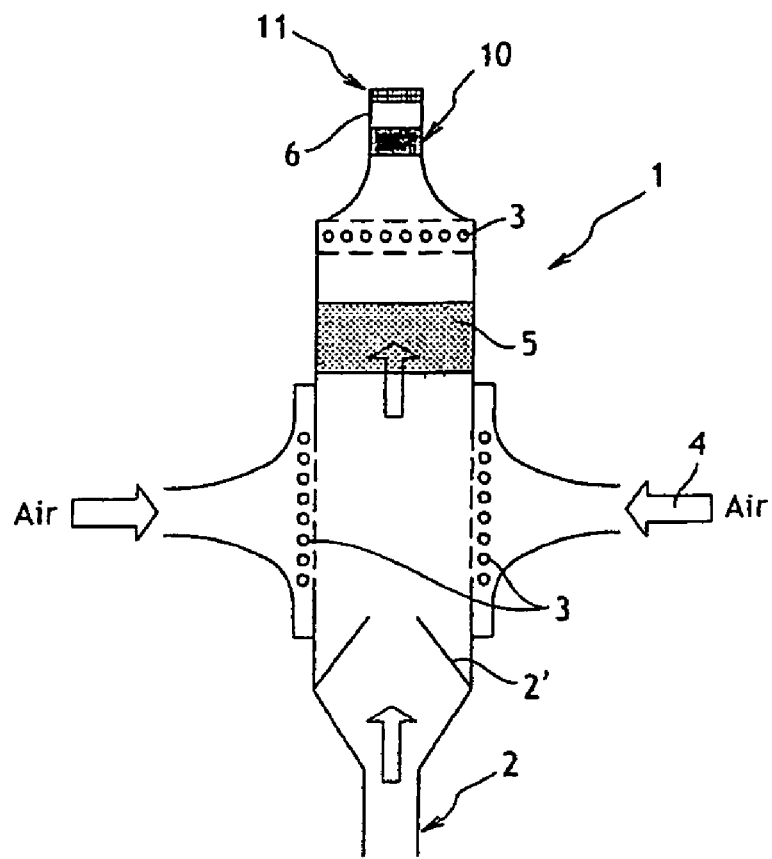
FIG. 1 is a schematic view of a cross section of a reactor, according to an embodiment.

FIG. 1 is a schematic view of a cross section of a reactor (1) for treating fumes issuing from products of petroleum origin according to an embodiment of the invention, which comprises a fume introduction system (2) containing a Venturi (2'), at least one dielectric discharge member (3) arranged at the reactor (1) walls, said members being arranged in a face-to-face layout, a system for introducing air (4) through each of the dielectric discharge members, a fluidized bed (5) of granular material located above the zone in which the dielectric discharge members (3) are arranged, an additional dielectric discharge member (3) located above the fluidized bed (5), two filter means (10, 11), and a discharge stack (6).

Figure 2:
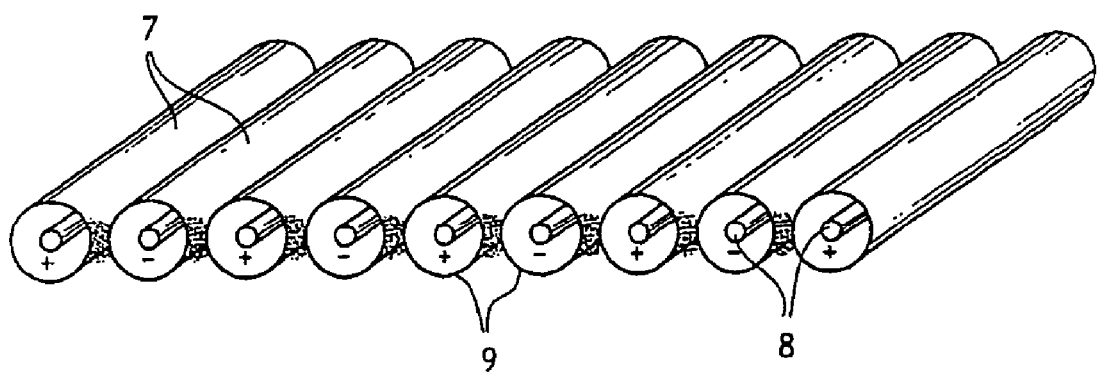
FIG. 2 is a schematic view of a dielectric discharge member, according to an embodiment.

FIG. 2 is a schematic view of dielectric discharge members (3), according to an embodiment of the invention, in the form of cassettes each consisting of a plurality of parallel electric tubes (7), said electric tubes each consisting of electric wires (8) sheathed in a dielectric insulation (9) and supplied by a high voltage generator.

The method according to the present invention is suitable for efficiently treating various types of volatile organic compounds (VOC) issuing from the production, conversion, handling and/or transport of products of petroleum origin, such as hydrocarbons, asphalts, bituminous mixes, and also fuel oil fumes, generated in particular by aggregate drying operations.

The fumes containing VOC are generally emitted when the products of petroleum origin are heated, advantageously between 50 and 250° C., more particularly between 50 and 180° C., even more advantageously between 100 and 180° C., under atmospheric pressure. The fumes generally appear during hot contact of the products of petroleum origin with air or with a material at ambient temperature. The fume liberation temperature depends on the types of product of petroleum origin treated. Thus, typically, a fume release is observed above 50° C. for epoxy asphalts, and at about 250° C. for hot mixes, of the type of hot asphalt mixes or "guβasphalts" in Germany.

The fumes to be treated are generally introduced in the lower part of the reactor, preferably at the base of the reactor.

Advantageously according to the invention, the fumes are introduced by a carrier air stream. The fumes are thereby introduced by suction into the reactor, with the suction air stream necessary for their transfer. A negative pressure is thereby created in the fume introduction system, particularly by means of a Venturi effect or a fan. The Venturi effect is advantageously created using baffles, preferably placed in or close to the fume introduction system. The fumes to be treated thereby enter into contact and are mixed with the active species of the dielectric discharge.

The method according to the present invention is suitable first for ensuring a chemical modification of the fume components to be treated by the species produced by the discharge in the reactor by the passage of air through the dielectric barrier discharge(s). The active species of the discharge, including ozone and excited oxygenated species, favor the combustion of the lighter species to be treated and the free radical degradation of the heavier species. The excited oxygen (atomic, molecular oxygen) and the ozone, which are powerful oxidants, promote the reactivity of the medium, and oxidation thereby serves to fragment the heavier hydrocarbons. In general, the free radicals formed lead to polymerization of the free radical organic molecules, and polymerization generally takes place on the trapping device.

Advantageously according to the present invention, the negative pressure zone created by the Venturi effect in the fume introduction system in the lower part of the reactor permits the direct introduction of atmospheric air into the reactor through the dielectric barrier discharge(s). Supplementary air injection devices can optionally be arranged in the neighborhood of the outer walls of the reactor, to provide air passages through the dielectric barrier discharge(s). Air can thereby optionally be introduced forcibly by a compressor or a blower in the effluent upflow to be treated.

At least one dielectric barrier discharge is present close to at least one of the reactor walls according to the present invention, and advantageously close to each reactor side wall. The dielectric barrier discharges are advantageously present immediately adjacent to the reactor side walls, or may even be arranged at or on the reactor walls. The dielectric barrier discharges may also be located at a longer distance near the reactor side walls.

According to a preferred embodiment of the invention, the dielectric discharge member(s) (3) replace at least part of the reactor wall(s). According to another preferred embodiment of the invention, the dielectric discharge member(s) replace the reactor side wall(s). A hole is thereby formed in the wall(s) or in at least part of the wall(s) to insert the dielectric discharge member(s) (3) in said wall(s). In an embodiment of the present invention, several dielectric barrier discharges may be positioned on each reactor wall or instead of each reactor wall. In this case, the dielectric barrier discharges are advantageously located above one another on each wall or behind one another.

After chemical modification of the fume components to be treated by the active species of the discharges such as ozone, the method according to the present invention serves to retain the reaction products generated in the reactor from the free radical entities resulting from the degradation of the fume components, using at least one appropriate trapping device.

In a particular embodiment of the present invention, the trapping device comprises at least one fluidized bed of a solid medium. The solid medium may be selected from the group consisting of aggregates, glass, and mixtures thereof. The solid medium according to the present invention is advantageously a granular material, which may be inorganic, organic, or a mixture of inorganic and organic materials. As an example of an organic medium, mention can be made of media based on rubber or recycle polymers such as polypropylene or polyethylene. Advantageously according to the present invention, the solid medium is a mineral granular material, preferably selected from the group consisting of alumina, silica and calcite. In a particular embodiment of the present invention, the solid medium is a microporous granular material, advantageously mineral, such as zeolite or pumice. The reaction products generated in the reactor from the free radical entities resulting from the degradation of the fume components being generally acidic, the solid medium according to the invention advantageously has a high acid neutralization capacity. The medium may thereby be a basic material, advantageously mineral, such as pozzolan or a carbonate type rock.

Advantageously according to the present invention, the size of said medium is between 0.5 mm and 20 mm, advantageously between 0.5 mm and 10 mm, even more advantageously between 1 mm and 10 mm.

The trapping device may be loaded or unloaded continuously, thereby permitting continuous treatment of the products of petroleum origin to be degraded. According to a particular feature of the present invention, the trapping device comprises at least one fluidized bed which is fixed or circulating. The fluidized bed according to the invention may thus be a circulating bed, permitting the continuous injection of solid particles into the fluid and avoiding any risk of caking of the particles during the deposits of the trapped polymer.

Advantageously according to the present invention, the trapping device is arranged perpendicular to the flow direction of the fumes to be treated passing through the reactor, preferably above the zone where the cold plasma is generated, i.e. above the zone where the dielectric discharge member(s) (3) is (are) arranged.

In a particular embodiment of the present invention, an additional dielectric barrier discharge is located close to the reactor outlet, advantageously placed perpendicular to the flow direction of the fumes passing through the reactor, even more advantageously above the trapping device (5), to permit a supplementary treatment to the dielectric barrier discharges arranged close to the reactor walls which extend parallel to the flow direction of the fumes to be treated.

Advantageously according to the present invention, the method further comprises, at the reactor outlet, a step of degradation of the residual ozone formed in the reactor by the passage of air through the dielectric barrier discharge(s). This residual ozone degradation step can be carried out using a filter placed at the reactor outlet, such as a metal grille, particularly a copper grille which can be heated to a temperature of about 50° C. to 70° C., typically about 60° C. Another filter means, such as quartz fabric, advantageously placed at the reactor outlet, may be used as a means for trapping VOC residues or other compounds to be degraded.

Advantageously according to the present invention, the method may also comprise an at least partial recirculation of the purified gases located in the gas stream leaving the reactor, either toward the reactor inlet, in a mixture with the fumes to be treated, or toward the dielectric barrier discharge(s) arranged in the neighborhood of the reactor walls.

The device according to the present invention, which is suitable for carrying out the method of the invention, contains a reactor (1) comprising:
- at least one fume introduction system (2) advantageously containing a Venturi system, in the lower part of the reactor (1), advantageously at the base of the reactor,
- at least one dielectric discharge member (3) arranged to replace at least part of at least one of the reactor (1) walls which extend parallel to the flow direction of the fumes passing through the reactor, at least one system for introducing air (4) through said dielectric discharge member(s), at least one appropriate trapping device (5) for retaining the reaction products generated in the reactor, and at least one discharge stack (6).

Advantageously according to the present invention, the dielectric discharge member(s) (3) is (are) made in the form of modulable cassettes each consisting of a plurality of parallel electric tubes (7), said electric tubes each consisting of electric wires (8), such as copper wires, sheathed in a dielectric insulation (9) and supplied by a high voltage generator. The direction of the parallel electric tubes (7) of the cassettes may be that of the vertical axis of the reactor (1) or the direction perpendicular to the vertical axis of the reactor (1).

In the context of the present invention, the term "modulable cassettes" means the fact that several cassettes may be arranged on at least one reactor wall—or instead of at least part of at least one reactor wall—to increase the efficiency of the method. The cassettes are thereby advantageously placed either behind one another, to increase the total capacity of the cassettes, or above one another to increase the residence time of the fumes in contact with the plasma generated in the reactor.

In a particular embodiment of the present invention, the electric wires (8) are connected to the edges of the frame of the cassettes, which are advantageously square (FIG. 2). Typically, the cassettes according to the present invention have a surface area of $50 \times 50$ cm$^2$ or of $20 \times 20$ cm$^2$, the impedance of the cassettes being matched to the electric power source (voltage, frequency, current).

The dielectric insulation sheaths (9) of the conducting tubes (7) are generally arranged around electric wires (8), thereby providing a uniform diffusion of the plasma in the reactor (1), the air being ionized on the edges of the dielectrics. The dielectric barrier discharges are generally created in the interstices between the parallel electric tubes (7). The dielectric insulation may be of quartz, ceramic or glass. The diameter of the electric wire (8) is advantageously about 1 to 2 mm. The capacity of the high voltage generator is typically about 1 to 20 kW, advantageously between 1 and 10 kW, even more advantageously between 5 and 10 kW. The voltage of such a generator is typically between 10 and 40 kV, and its frequency is 1 to 20 kHz.

The diameter of the dielectric insulation sheath (9) is typically between 2 and 10 mm, advantageously between 2 to 8 mm, even more advantageously between 2 and 5 mm. The space between the parallel electric tubes (7) is typically between 1 and 2 mm.

The device according to the present invention advantageously further comprises at least one filter means (10, 11) in the upper part of the reactor (1), before the discharge stack (6), static or dynamic, which may be a metal grille (11) such as a copper grille which can be heated, particularly to remove the residual ozone, and/or a mineral filter such as a glass fiber or quartz fabric filter (10), particularly for trapping residual VOC.

In a particular embodiment according to the present invention, the trapping device (5) comprises at least one fluidized bed of granular materials. The device and the method according to the present invention can then be used for producing aggregates to produce a roadbuilding product. The aggregates are then coated in the reaction products (generally products of the polymer type) generated in the reactor from the free radical entities resulting from the degradation of the fume compounds, and the aggregates can then be reused or recycled for roadbuilding applications. The device and the method according to the present invention can thereby be used for the production of a hot mix or a bituminous mix, by mixing the coated aggregates as obtained by the present invention with an asphalt-based mixture.

The following nonlimiting example illustrates the present invention.

EMBODIMENT OF THE INVENTION

A device according to the present invention comprises a reactor (1) with a rectangular base, equipped with a fume introduction system (2) with Venturi, two dielectric discharge members (3) replacing part of each side wall of the reactor (1) and arranged parallel to the gas flow, a system for injecting dry air (4) through said dielectric discharge members, a trapping device (5) consisting of a fluidized bed of a pozzolan aggregate, a mineral filter which collects the residual VOC and a discharge stack (6).

Such a device was used to purify products such as asphalt fumes containing VOC, of which the initial contents of the effluents were 5 kg/hour. The operation of the device for two hours served to remove 80 to 90% of the effluents on the mineral filter using appropriate treatment, with a gas-VOC mixture and excited species of the discharge by Venturi effect.

The invention claimed is:

1. A method for treating fumes generated during production, conversion and/or handling of heated products of petroleum origin, comprising the steps of:

introducing said fumes into a reactor in which the fume components undergo free radical degradation by cold plasma generated in the reactor by introduction of air through at least one dielectric discharge member arranged close to at least one of the reactor walls which extend parallel to a flow direction of the fumes passing through the reactor, wherein the reactor is configured such that the fumes introduced into the reactor are degraded by active species generated in the reactor by the air introduced through the at least one dielectric discharge member, such that the fumes do not directly contact the at least one dielectric discharge member, and retaining reaction products generated in the reactor from free radical entities resulting from degradation of the fume components with at least one appropriate trapping device.

2. The method as claimed in claim 1, wherein the fumes are introduced by a carrier air stream.

3. The method as claimed in claim 1, wherein at least one dielectric discharge member is present close to each side wall of the reactor.

4. The method as claimed in claim 1, wherein the trapping device comprises at least one fluidized bed of a mineral medium.

5. The method as claimed in claim 4, wherein said medium is a granular material containing alumina, silica, or calcite.

6. The method as claimed in claim 4, wherein said medium is a microporous granular material comprising zeolite or pumice.

7. The method as claimed in claim 4, wherein said medium is a basic granular material comprising pozzolan or a carbonate type rock.

8. The method as claimed in claim 4, wherein a size of said medium is between 0.5 mm and 20 mm.

9. The method as claimed in claim 8, wherein the size of said medium is between 1 mm and 10 mm.

10. The method as claimed in claim 4, wherein the fluidized bed is fixed or circulating.

11. The method of claim 4, wherein the trapping device comprises at least one fluidized bed of granular materials, and further comprising a step of treating an aggregate used in a roadbuilding product.

12. The method as claimed in claim 1, wherein another dielectric discharge member is located close to an outlet of the reactor, placed perpendicular to the flow direction of the fumes passing through the reactor.

13. The method as claimed in claim 1, further comprising, at an outlet of the reactor, a step of degrading the residual ozone formed in the reactor by the passage of the air through the at least one dielectric barrier member.

14. The method as claimed in claim 1, further comprising an at least partial recirculation of purified gases located in a gas stream leaving the reactor to an inlet of the reactor, in a mixture with the fumes to be treated.

15. The method as claimed in claim 1, wherein the heated products of petroleum origin comprise hydrocarbons, asphalts, and bituminous hot mixes.

16. A device for treating fumes generated during production, conversion and/or handling of heated products of petroleum origin in a reactor comprising:
    at least one fume introduction system in a lower part of the reactor,
    at least one dielectric discharge member that replaces at least part of at least one reactor wall which extends parallel to a flow direction of fumes passing through the reactor,
    at least one system for introducing air through said at least one dielectric discharge member,
    wherein the device is configured such that fumes introduced into the reactor are degraded by active species generated in the reactor by the air introduced through the at least one dielectric discharge member, such that the fumes do not directly contact the at least one dielectric discharge member.
    at least one appropriate trapping device configured to retain reaction products generated in the reactor, and
    at least one discharge stack.

17. The device as claimed in claim 16, wherein the fume introduction system contains a Venturi.

18. The device as claimed in claim 16, wherein the at least one dielectric discharge member is a modulable cassette consisting of a plurality of parallel electric tubes, said electric tubes each consisting of electric wires sheathed in a dielectric insulation and supplied by a high voltage generator.

19. The device as claimed in claim 16, wherein the electric wires comprise copper.

20. The device as claimed in claim 16, wherein the dielectric insulation comprises quartz, ceramic or glass.

21. The device as claimed in claim 16, wherein a diameter of the dielectric insulation sheath is between 2 and 10 mm.

22. The device as claimed in claim 16, wherein a space between the parallel electric tubes is between 1 and 2 mm.

23. The device as claimed in claim 16, wherein the at least one dielectric discharge member comprises dielectric discharge members that replace at least part of each side wall of the reactor, wherein said dielectric discharge members are arranged in a face-to-face layout.

24. The device as claimed in claim 16, wherein the trapping device comprises at least one fluidized bed of a mineral medium.

25. The device as claimed in claim 16, further comprising at least one filter in an upper part of the reactor before the discharge stack.

26. The device as claimed in claim 16, further comprising at least one dielectric discharge member in an upper part of the reactor before the discharge stack.

27. The device as claimed in claim 16, wherein a long axis of the at least one dielectric discharge member extends parallel to the flow direction of the fumes passing through the reactor.

28. A roadbuilding product comprising a hot mix or a bituminous mix treated by the method of claim 1.

* * * * *